United States Patent
Li et al.

(10) Patent No.: US 12,237,521 B2
(45) Date of Patent: Feb. 25, 2025

(54) LITHIUM-ION CELL

(71) Applicant: Tianjin Lishen Battery Joint-Stock Co., Ltd., Tianjin (CN)

(72) Inventors: Wei Li, Tianjin (CN); Nianju Wang, Tianjin (CN); Yuanyuan Ya, Tianjin (CN); Xueheng Jia, Tianjin (CN); Gang Liu, Tianjin (CN)

(73) Assignees: TIANJIN LISHEN BATTERY JOINT-STOCK CO., LTD., Tianjin (CN); TIANJIN LISHEN JUYUAN NEW ENERGY TECHNOLOGY CO. LTD., Tianjin (CN)

( * ) Notice: Subject to any disclaimer, the term of this patent is extended or adjusted under 35 U.S.C. 154(b) by 518 days.

(21) Appl. No.: 17/727,796

(22) Filed: Apr. 24, 2022

(65) Prior Publication Data
US 2022/0247020 A1    Aug. 4, 2022

Related U.S. Application Data (63) Continuation-in-part of application No. PCT/CN2020/131694, filed on Nov. 26, 2020.

(30) Foreign Application Priority Data

Apr. 6, 2020   (CN) .......................... 202010262233.4

(51) Int. Cl.
*H01M 50/148*   (2021.01)
*H01M 10/04*   (2006.01)
(Continued)

(52) U.S. Cl.
CPC ..... *H01M 50/154* (2021.01); *H01M 10/0468* (2013.01); *H01M 50/107* (2021.01);
(Continued)

(58) Field of Classification Search
CPC ............. H01M 50/154; H01M 50/668; H01M 50/636; H01M 10/0587; H01M 50/531
See application file for complete search history.

(56) References Cited

U.S. PATENT DOCUMENTS 3,042,734 A * 7/1962 Carmichael ............. H01M 6/08
429/170
9,030,805 B2 * 5/2015 Miura ..................... H01G 11/82
361/511

(Continued)

FOREIGN PATENT DOCUMENTS

JP   2003317805 A  * 11/2003  ........ H01M 10/0525
KR   20130115263 A  * 10/2013

OTHER PUBLICATIONS

Machine Translation of KR-20130115263-A (Oct. 8, 2024) (Year: 2024).*

(Continued)

*Primary Examiner* — Matthew J Merkling
(74) *Attorney, Agent, or Firm* — MATTHIAS SCHOLL P.C.; Matthias Scholl (57) ABSTRACT

A cell includes an electrode assembly, a pin assembly, and a cell house. The electrode assembly includes a central hole, at least one positive electrode, at least one negative electrode, and at least one diaphragm separating the at least one positive electrode from the at least one negative electrode. The at least one positive electrode, the at least one negative electrode and the at least one diaphragm are disposed around the central hole in a spiral winding manner. The pin assembly is disposed in the central hole for polarity separation. The pin assembly includes a housing including an axial through hole; the housing is partially or fully disposed in the central hole. The pin assembly further includes an insulating part for separating the polarity of the cell and at least one (Continued)

electrode lead. The cell house is hermetically connected to the housing.

24 Claims, 11 Drawing Sheets

(51) Int. Cl.
| | |
|---|---|
| *H01M 10/0525* | (2010.01) |
| *H01M 50/107* | (2021.01) |
| *H01M 50/116* | (2021.01) |
| *H01M 50/14* | (2021.01) |
| *H01M 50/184* | (2021.01) |
| *H01M 50/46* | (2021.01) |
| *H01M 50/531* | (2021.01) |
| *H01M 50/536* | (2021.01) |
| *H01M 50/60* | (2021.01) |
| *H01M 50/636* | (2021.01) |

(52) U.S. Cl.
CPC ......... *H01M 50/116* (2021.01); *H01M 50/14* (2021.01); *H01M 50/184* (2021.01); *H01M 50/46* (2021.01); *H01M 50/531* (2021.01); *H01M 50/536* (2021.01); *H01M 50/636* (2021.01); *H01M 50/668* (2021.01); *H01M 10/0525* (2013.01)

(56) References Cited

U.S. PATENT DOCUMENTS

| | | | |
|---|---|---|---|
| 10,186,692 B2* | 1/2019 | Sekiya | H01M 10/0431 |
| 10,529,981 B2* | 1/2020 | Sato | H01M 4/1395 |
| 10,749,149 B2* | 8/2020 | Logan | H01M 50/477 |
| 2011/0129706 A1* | 6/2011 | Takahashi | H01M 10/613 |
| | | | 429/94 |
| 2011/0183163 A1* | 7/2011 | Suzuki | H01M 10/0587 |
| | | | 29/623.2 |
| 2013/0280571 A1* | 10/2013 | Eguchi | H01M 10/049 |
| | | | 429/94 |

OTHER PUBLICATIONS

Machine Translation of JP-2003317805-A (Oct. 9, 2024) (Year: 2024).*

* cited by examiner

LITHIUM-ION CELL

CROSS-REFERENCE TO RELATED APPLICATIONS

This application is a continuation-in-part of International Patent Application No. PCT/CN2020/131694 with an international filing date of Nov. 26, 2020, designating the United States, now pending, and further claims foreign priority benefits to Chinese Patent Application No. 202010262233.4 filed Apr. 6, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a lithium-ion cell.

With long cycle life, good rate capability, safety, reliability, and environmental friendliness, lithium-ion cells are widely used in various energy storage products, consumer electronic products, and power cell products. According to the manufacturing process, lithium-ion cells can be divided into soft wrapped lithium-ion cells, square aluminum shell cells and steel shell cylindrical cells. Among them, the steel shell cylindrical cells are widely used in power vehicle because of its highly standardized manufacturing process and low cost. As a rapidly developing new energy industry, under the fierce market competition, customers have higher and higher requirements for the energy density and appearance of the cell.

Conventionally, the separation of cell polarity occupies part of the space of the cylindrical cells. For example, the positive and negative electrodes of the traditional 18650 and 21700 cylindrical cells are the bottom shell and the shell cover of the cells, respectively. The separation of the positive and negative electrodes is realized by sealing the shell cover with an insulating rubber ring through the edging process. The above structure occupies about 4-6 mm length of the cell, which leads to 5.7%-10% space waste. As a result, when the height of the cell is reduced, the energy density decreases sharply. Therefore, for the cylindrical cell (button cell) with small height, the polarity separation of the cell is designed along the radial direction. The positive and negative electrodes of this kind of cell are connected to the bottom shell and the shell cover respectively. The bottom shell is secured to the shell cover coaxially, and the middle part therebetween is filled with an insulating layer for polarity separation. The polar separation structure is in the outermost ring of the cell (refer to patent ZL201080007121.9). This structure needs to occupy about 0.6 mm space of the outermost ring of the circular section. For cells with a diameter of 8-20 mm, the design leads to 6%-15% space waste.

At present, the electrode assembly of the cylindrical cells is formed through winding or lamination process. It has been found that the energy density of the winding structure is optimal. When a cylindrical electrode assembly is formed through winding, a central hole for accommodating the winding needle will inevitably be left, and the diameter of the hole is generally greater than 1 mm. On the one hand, the central hole wastes the cell space. On the other hand, the existence of the central hole may also lead to the collapse of the electrode assembly during use. Therefore, to stabilize the structure, a pin is disposed in the central hole of the electrode assembly. However, this increases the process complexity.

SUMMARY

To solve the aforesaid problems, an objective of the disclosure is to provide a cell.

To achieve the aforesaid objective, the disclosure provides a cell, comprising:

an electrode assembly comprising a central hole, at least one positive electrode, at least one negative electrode, and at least one diaphragm separating the at least one positive electrode from the at least one negative electrode. The at least one positive electrode, the at least one negative electrode and the at least one diaphragm are disposed around the central hole in a spiral winding manner. The central hole has a diameter of greater than 0 and smaller than that of the cell.

A pin assembly is disposed in the central hole for polarity separation; the pin assembly comprises a housing comprising an axial through hole; the housing is partially or fully disposed in the central hole; the pin assembly further comprises an insulating part for separating the polarity of the cell and at least one electrode lead; the insulating part is disposed in the axial through hole; the at least one electrode lead passes through the insulating part and is connected to the at least one positive electrode or the at least one negative electrode for separating the polarity of the cell.

A cell house is hermetically connected to the housing, thus forming a ring-shaped seal cavity for accommodating the electrode assembly.

In a class of this embodiment, the housing has a longitudinal section in the shape of "⊐⊏" and comprises a tube and a disc-shaped flange extending outwardly from the top of the tube, and the axial through hole is disposed in the tube.

In a class of this embodiment, the cell house has a U-shaped longitudinal section.

In a class of this embodiment, the housing has a longitudinal section in the shape of "⊓⊓" and comprises a tube and two circular tubes extending outwardly from two ends of the top of the tube, and the axial through hole is disposed in the tube.

In a class of this embodiment, the cell house is in the shape of a disc, and has a longitudinal section in the shape of "-".

In a class of this embodiment, the housing has a longitudinal section in the shape of "║" and comprises a circular tube, and the axial through hole is disposed in the circular tube.

In a class of this embodiment, the cell house has a longitudinal section in the shape of "⊏⊐".

In a class of this embodiment, the insulating part is partially or fully disposed in the axial through hole of the housing of the pin assembly.

In a class of this embodiment, the insulating part has a longitudinal section in the shape of "⊥", and comprises a columnar part inserted into the axial through hole and an end cap that extends outwardly from the bottom of the columnar part to fully cover the lower end of the axial through hole.

In a class of this embodiment, the cell further comprises a liquid injection hole through which an electrolyte flows into the cell.

In a class of this embodiment, the liquid injection hole is disposed on the pin assembly and/or on the cell house.

In a class of this embodiment, the liquid injection hole is disposed on the insulating part of the pin assembly.

In a class of this embodiment, the liquid injection hole is sealed with a sealing member to prevent the electrolyte from leaking out through the liquid injection hole.

In a class of this embodiment, the sealing member adopts one of the following structures:
1) The sealing member comprises an end cap structure; the end cap structure comprises an end and an embedded part disposed at the lower end of the end; the end covers the axial through hole, and the embedded part is disposed in the axial through hole; and
2) The sealing member comprises at least one steel ball; the at least one steel ball is disposed in the liquid injection hole in an interference fit.

In a class of this embodiment, the cell is a lithium-ion cell and further comprises at least one lithium intercalated electrode.

In a class of this embodiment, the at least one positive electrode, the at least one negative electrode, and the at least one diaphragm each are in the form of a flat strip.

In a class of this embodiment, the components in the electrode assembly are arranged in the following order:
the negative electrode/the diaphragm/the positive electrode/the diaphragm; or
the positive electrode/the diaphragm/the negative electrode/the diaphragm.

In a class of this embodiment, the pin assembly and the cell house comprise a waterproof material.

In a class of this embodiment, the waterproof material is a metal material or a non-metal material.

In a class of this embodiment, the metal material is stainless steel, aluminum, or aluminum alloy.

In a class of this embodiment, the non-metal material is ceramic or plastic.

In a class of this embodiment, the at least one positive electrode or the at least one negative electrode is electrically connected to the at least one electrode lead with one of the following connection modes:
1) the lower end of the at least one electrode lead is soldered to one end of an intermediate conductor, and the other end of the intermediate conductor is soldered to the at least one positive electrode or the at least one negative electrode; and
2) the lower end of the at least one electrode lead is soldered to the at least one positive electrode or the at least one negative electrode.

In a class of this embodiment, the insulating part comprises polypropylene.

In a class of this embodiment, the cell has a circular or elliptical cross section.

Compared with the related art, the polarity separation of the cell of the disclosure is achieved in the central hole of the electrode assembly. The insulating part for separating the polarity of the cell is disposed in the central hole; the at least one electrode lead is disposed in the central hole; one end of the at least one electrode lead is electrically connected to the at least one positive electrode or the at least one negative electrode, and the other end acts as a lead-out terminal of the positive electrode and/or negative electrode.

For example, the positive electrode is led out from the central hole of the electrode assembly. The negative electrode is conductively connected to a metal housing. The insulating part is filled in the central hole for polarity separation. The positive pole of the cell is the output terminal of the electrode lead extending out from the central hole, and the negative pole is the metal housing.

For example, the negative electrode is led out from the central hole of the electrode assembly. The negative electrode is conductively connected to a metal housing. The insulating part is disposed in the central hole to separate the electrode lead in the central hole from the metal housing thereby achieving the polarity separation of the cell. The positive pole of the cell is the metal housing, and the negative pole is the electrode lead extending out from the central hole.

For example, both the positive electrode and the negative electrode are led out from the central hole of the electrode assembly through two electrode leads, and insulating part is disposed in the central hole to separate the two electrode leads thereby achieving the polarity separation of the cell. The positive and negative poles of the cell are the two electrode leads respectively connected to the positive electrode and negative electrode.

The pin assembly and the cell house comprise waterproof materials to improve the waterproof properties of the cell.

The cell house is configured for sealed connection with the pin assembly, thereby forming a ring-shaped cavity. The electrode assembly is disposed in the ring-shaped cavity that provides a stable working environment for the electrochemical components. The cell of the disclosure may be assembled using plastic sealing and soldering.

The cell house and the housing comprise at least one liquid injection hole through which the electrolyte is injected into the cell. A sealing member is disposed at the at least one liquid injection hole so as to prevent the electrolyte from leaking out the cell. The liquid injection hole coincides with the central hole of the electrode assembly, which can further save the cell space, improve the utilization rate of the cell space and provide higher energy density.

BRIEF DESCRIPTION OF THE DIAGRAMS

DESCRIPTION OF THE INVENTION

To further illustrate, embodiments detailing a cell are described below. It should be noted that the following embodiments are intended to describe and not to limit the disclosure.

Example 1

Figure 1:
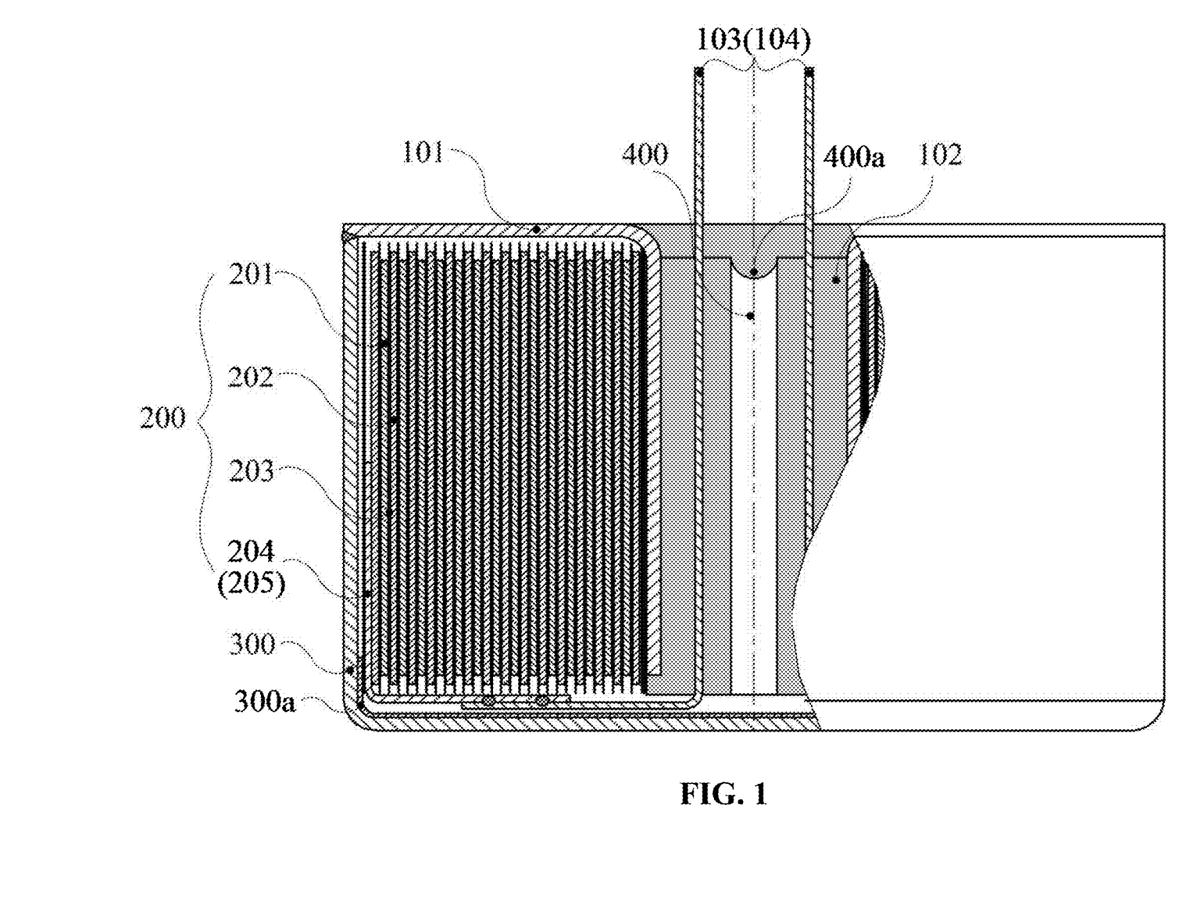
FIG. 1 is a schematic diagram of a cell of Example 1 of the disclosure.

As shown in FIG. 1, a cell comprises an electrode assembly and a cell house.

The electrode assembly 200 comprises a central hole, at least one positive electrode 201, at least one negative electrode 202, and a diaphragm 203 separating the positive electrode and the negative electrode. The positive electrode 201, the negative electrode 202 and the diaphragm 203 are disposed around the central hole in a spiral winding manner. The central hole has a diameter greater than 0 and smaller than that of the cell.

A pin assembly is disposed in the central hole for polarity separation. The pin assembly comprises a housing 101 comprising an axial through hole. The housing 101 is partially inserted into the central hole. The pin assembly further comprises an insulating part 102 for polarity separation, a positive electrode lead 103, and a negative electrode lead 104. The insulating part 102 is disposed in the axial through hole of the housing 101. The positive electrode lead 103 and the negative electrode lead 104 penetrate through the insulating part 102. The positive electrode 201 and the negative electrode 202 are both conductively connected to the positive electrode lead 103 and the negative electrode lead 104, respectively, thereby achieving the polarity separation.

A cell house 300 is hermetically connected to the housing, thus forming a ring-shaped seal cavity for accommodating the electrode assembly.

The lower ends of the positive electrode lead 103 and the negative electrode lead 104 are soldered to one end of a first intermediate conductor 204 and one end of a second intermediate conductor 205, respectively; and the other end of the first intermediate conductor 204 and the other end of the second intermediate conductor 205 are soldered to the positive electrode or the negative electrode, respectively.

The insulating part 102 is partially disposed in the axial through hole. The insulating part 102 has a longitudinal section in the shape of "Z", and comprises a columnar part inserted into the axial through hole and an end cap that extends outwardly from the bottom of the columnar part to fully cover the lower end of the axial through hole. This structure prevents the contact of the lower end of the axial through-hole with the positive electrode lead 103 and the negative electrode lead 104 thus preventing short circuit. The insulating part can also be fully inserted into the axial through hole, leaving only the columnar part. Such a transformation also falls in the scope of protection of this application. Optionally, the positions of the positive electrode lead 103 and the negative electrode lead 104 are exchangeable.

A layer of insulating tape 300a is disposed on the inner surface of the bottom end of the cell house 300 to prevent a short circuit between the positive electrode lead 103, the negative electrode lead 104 and the cell house 300, and also to prevent the short circuit between the first intermediate conductor 204, the second intermediate conductor 205 and the cell house 300.

Figure 4:
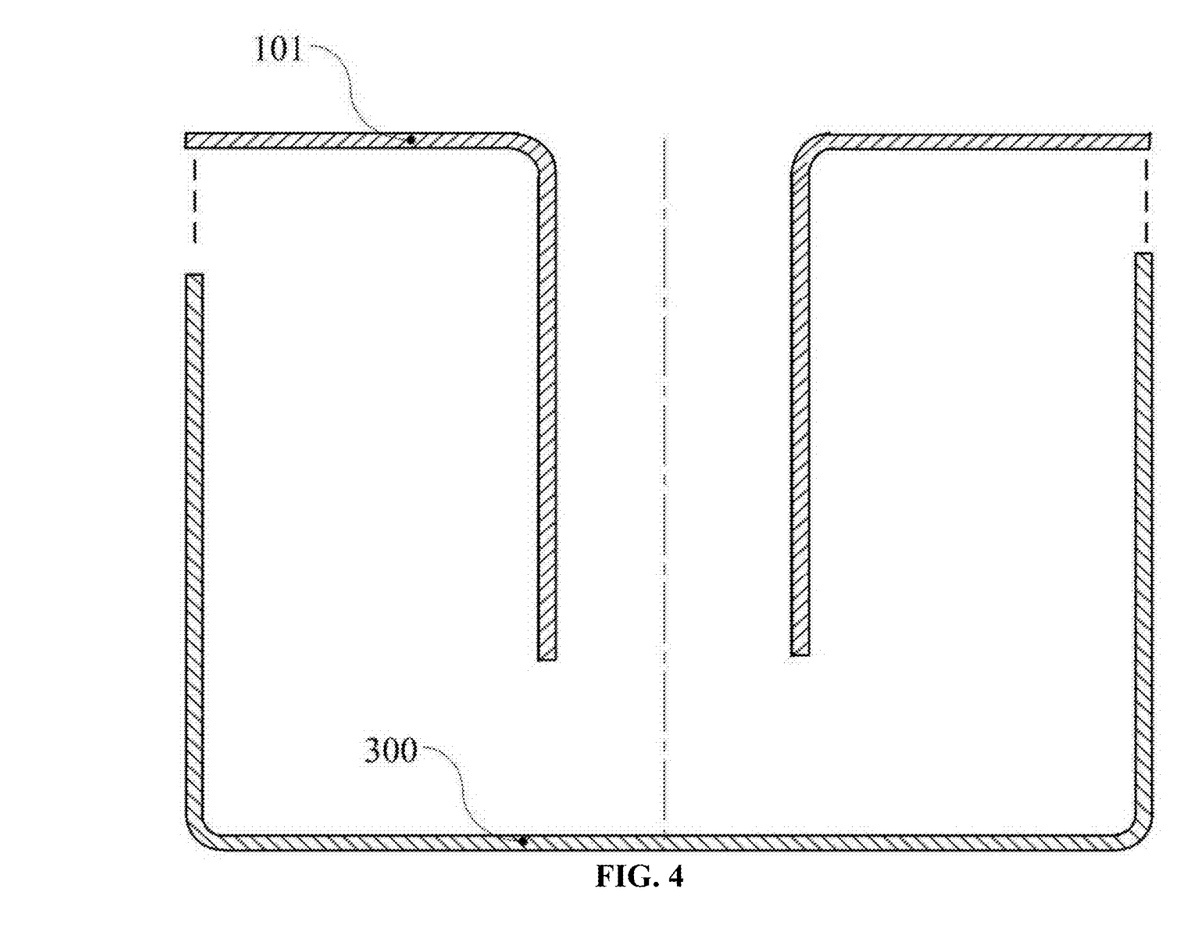
FIG. 4 is a schematic diagram of a connection between a cell house and a housing of Example 1 of the disclosure.

As shown in FIG. 4, the housing 101 has a longitudinal cross section in a shape of " ⊓ ", and comprises a tube and a disc-shaped flange extending outwardly from the top of the tube. The axial through hole is disposed in the tube. The cell house 300 has a U-shaped longitudinal section. The cell house 300 is spliced or integrally formed with the housing 101.

Preferably, the liquid injection hole 400 is disposed on the insulating part 102. The liquid injection hole is sealed with a sealing member 400a to prevent the electrolyte from leaking out through the liquid injection hole 400. The sealing member comprises an end cap structure; the end cap structure comprises an end and an embedded part disposed on the lower end of the end; the end covers the axial through hole, and the embedded part is disposed in the axial through hole. In this way, the embedded part and the end can seal the liquid injection hole 400 doubly.

Example 2

Figure 2:
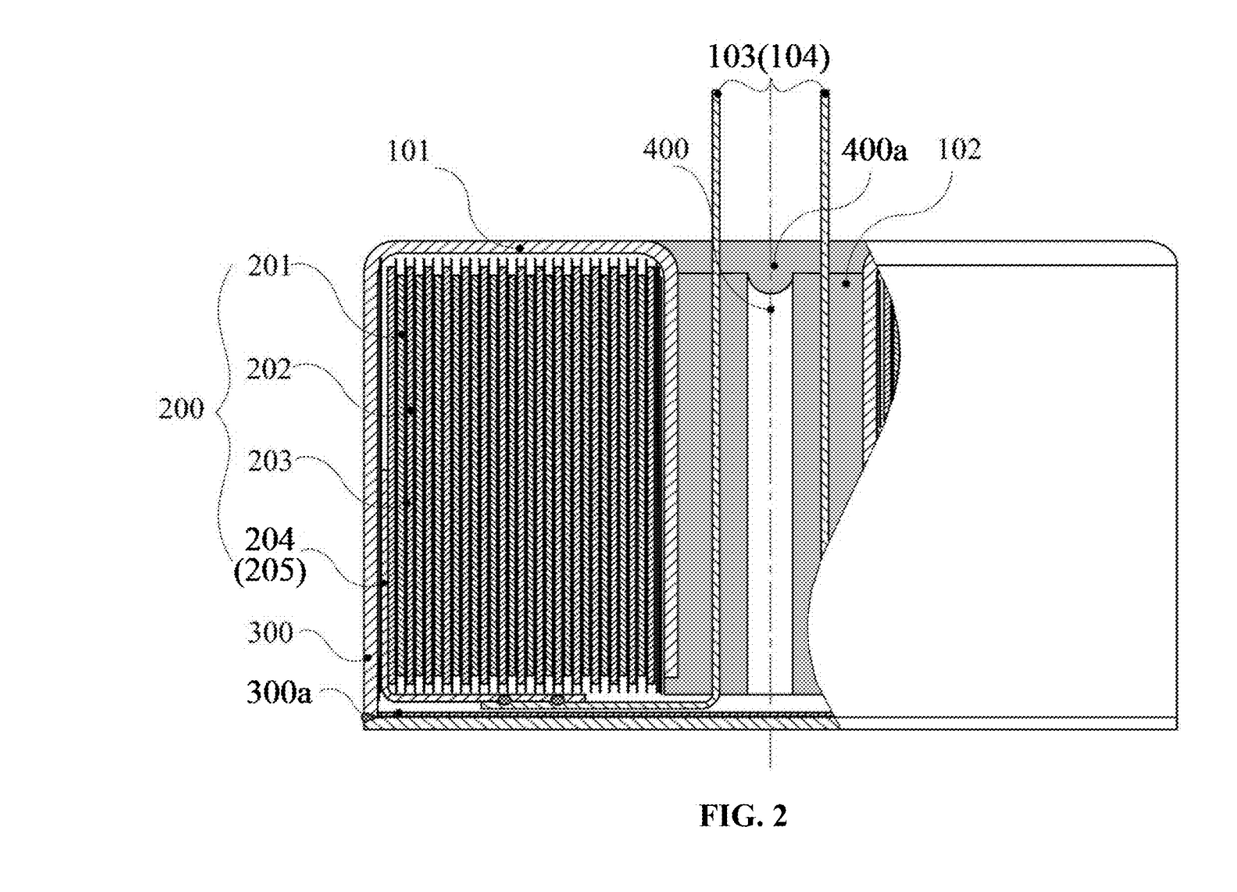
FIG. 2 is a schematic diagram of a cell of Example 2 of the disclosure.

As shown in FIG. 2, the example and Example 1 are the same except for the structures of the cell house 300 and the housing 101.

An electrode assembly 200 comprises a central hole, at least one positive electrode 201, at least one negative electrode 202, and a diaphragm 203 separating the positive electrode and the negative electrode. The positive electrode 201, the negative electrode 202 and the diaphragm 203 are disposed around the central hole in a spiral winding manner. The central hole has a diameter greater than 0 and smaller than that of the cell.

A pin assembly is disposed in the central hole for polarity separation. The pin assembly comprises a housing 101 comprising an axial through hole. The housing 101 is partially inserted into the central hole. The pin assembly further comprises an insulating part 102 for polarity separation, a positive electrode lead 103, and a negative electrode lead 104. The insulating part 102 is disposed in the axial through hole of the housing 101. The positive electrode lead 103 and the negative electrode lead 104 penetrate through the insulating part 102. The positive electrode 201 and the negative electrode 202 are both conductively connected to the positive electrode lead 103 and the negative electrode lead 104, respectively, thereby achieving the polarity separation.

A cell house 300 is hermetically connected to the housing, thus forming a ring-shaped seal cavity for accommodating the electrode assembly.

The lower ends of the positive electrode lead 103 and the negative electrode lead 104 are soldered to one end of a first intermediate conductor 204 and one end of a second intermediate conductor 205, respectively; and the other end of the first intermediate conductor 204 and the other end of the second intermediate conductor 205 are soldered to the positive electrode or the negative electrode, respectively.

The insulating part 102 is partially disposed in the axial through hole. The insulating part 102 has a longitudinal section in the shape of " ⊥ ", and comprises a columnar part inserted into the axial through hole and an end cap that extends outwardly from the bottom of the columnar part to fully cover the lower end of the axial through hole. This structure prevents the contact of the lower end of the axial through-hole with the positive electrode lead 103 and the negative electrode lead 104 thus preventing short circuit.

Optionally, the positions of the positive electrode lead 103 and the negative electrode lead 104 are exchangeable.

A layer of insulating tape 300a is disposed on the inner surface of the bottom end of the cell house 300 to prevent a short circuit between the positive electrode lead 103, the negative electrode lead 104 and the cell house 300, and also to prevent the short circuit between the first intermediate conductor 204, the second intermediate conductor 205 and the cell house 300.

Figure 5:
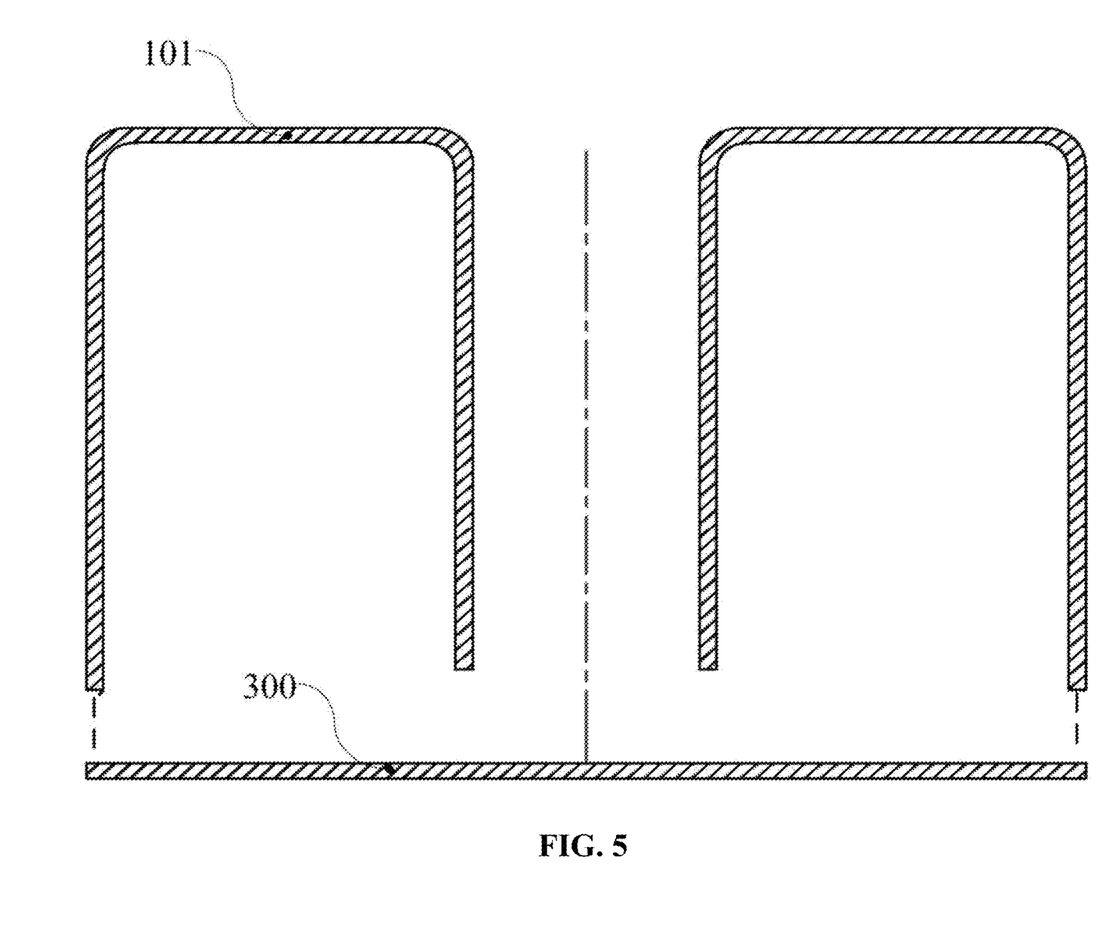
FIG. 5 is a schematic diagram of a connection between a cell house and a housing of Example 2 of the disclosure.

As shown in FIG. 5, the housing 101 has a longitudinal section in the shape of " ⊓⊓ " and comprises a tube and two circular tubes extending outwardly from two ends of the top of the tube. The axial through hole is disposed in the tube. The cell house is in the shape of a disc and has a longitudinal section in the shape of "-". The cell house 300 is spliced or integrally formed with the housing 101.

Preferably, the liquid injection hole 400 is disposed on the insulating part 102. The liquid injection hole is sealed with a sealing member 400a to prevent the electrolyte from leaking out through the liquid injection hole 400. The sealing member comprises an end cap structure; the end cap structure comprises an end and an embedded part disposed on the lower end of the end; the end covers the axial through hole, and the embedded part is disposed in the axial through hole. In this way, the embedded part and the end can seal the liquid injection hole 400 doubly.

Example 3

Figure 3:
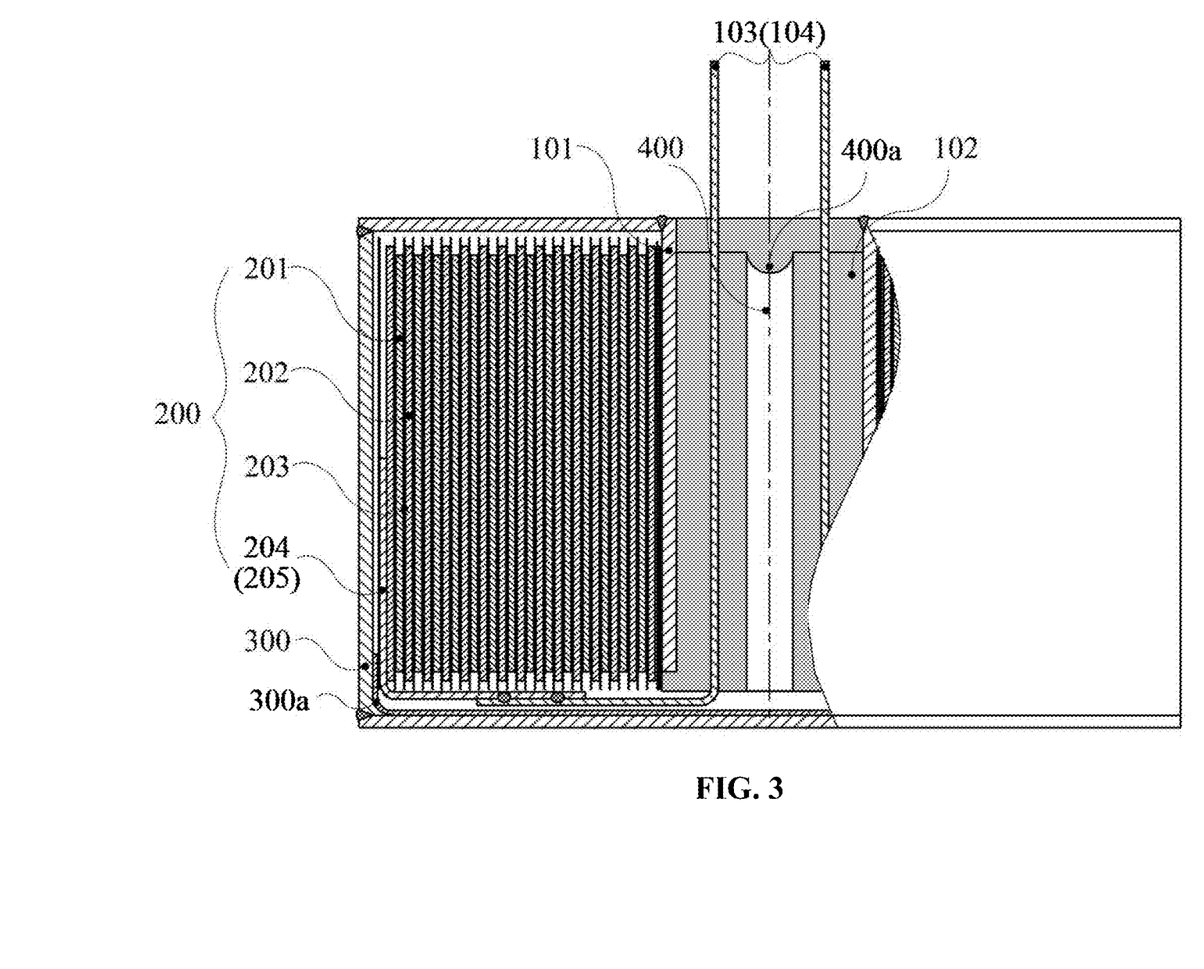
FIG. 3 is a schematic diagram of a cell of Example 3 of the disclosure.

As shown in FIG. 3, the example, Example 1 and Example 2 are the same except for the structures of the cell house 300 and the housing 101.

An electrode assembly 200 comprises a central hole, at least one positive electrode 201, at least one negative electrode 202, and a diaphragm 203 separating the positive electrode and the negative electrode. The positive electrode 201, the negative electrode 202 and the diaphragm 203 are disposed around the central hole in a spiral winding manner. The central hole has a diameter greater than 0 and smaller than that of the cell.

A pin assembly is disposed in the central hole for polarity separation. The pin assembly comprises a housing 101 comprising an axial through hole. The housing 101 is partially inserted into the central hole. The pin assembly further comprises an insulating part 102 for polarity separation, a positive electrode lead 103, and a negative electrode lead 104. The insulating part 102 is disposed in the axial through hole of the housing 101. The positive electrode lead 103 and the negative electrode lead 104 penetrate through the insulating part 102. The positive electrode 201 and the negative electrode 202 are both conductively connected to the positive electrode lead 103 and the negative electrode lead 104, respectively, thereby achieving the polarity separation.

A cell house 300 is hermetically connected to the housing, thus forming a ring-shaped seal cavity for accommodating the electrode assembly.

The lower ends of the positive electrode lead 103 and the negative electrode lead 104 are soldered to one end of a first intermediate conductor 204 and one end of a second intermediate conductor 205, respectively; and the other end of the first intermediate conductor 204 and the other end of the second intermediate conductor 205 are soldered to the positive electrode or the negative electrode, respectively.

The insulating part 102 is partially disposed in the axial through hole. The insulating part 102 has a longitudinal section in the shape of "凸", and comprises a columnar part inserted into the axial through hole and an end cap that extends outwardly from the bottom of the columnar part to fully cover the lower end of the axial through hole. This structure prevents the contact of the lower end of the axial through-hole with the positive electrode lead 103 and the negative electrode lead 104 thus preventing short circuit.

Optionally, the positions of the positive electrode lead 103 and the negative electrode lead 104 are exchangeable.

A layer of insulating tape 300a is disposed on the inner surface of the bottom end of the cell house 300 to prevent a short circuit between the positive electrode lead 103, the negative electrode lead 104 and the cell house 300, and also to prevent the short circuit between the first intermediate conductor 204, the second intermediate conductor 205 and the cell house 300.

Figure 6:
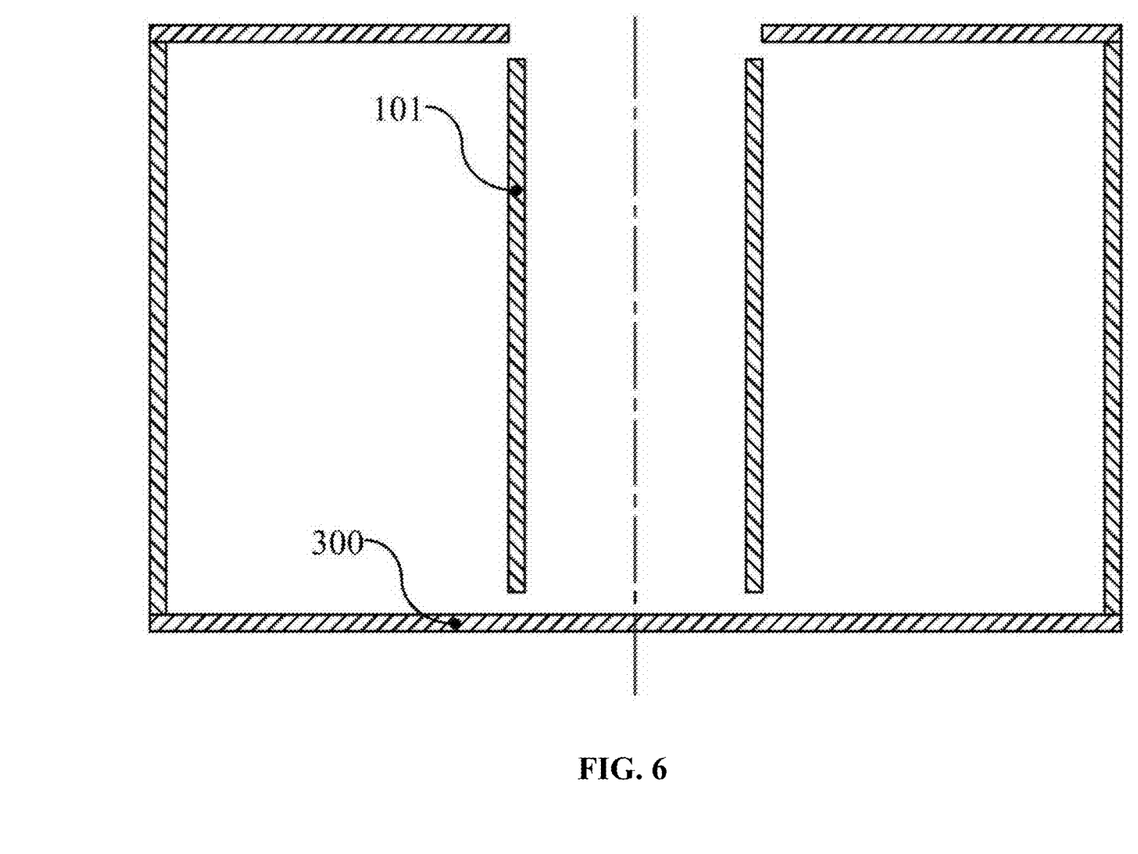
FIG. 6 is a schematic diagram of a connection between a cell house and a housing of Example 3 of the disclosure.

As shown in FIG. 6, the housing 101 has a longitudinal section in the shape of "╠" and comprises a circular tube. The axial through hole is disposed in the circular tube. The cell house 300 has a longitudinal section in the shape of "└┘". The housing 101 is integrally formed or spliced together. In the example, the cell house 300 is formed by splicing.

Preferably, the liquid injection hole 400 is disposed on the insulating part 102. The liquid injection hole is sealed with a sealing member 400a to prevent the electrolyte from leaking out through the liquid injection hole 400. The sealing member comprises an end cap structure; the end cap structure comprises an end and an embedded part disposed on the lower end of the end; the end covers the axial through hole, and the embedded part is disposed in the axial through hole. In this way, the embedded part and the end can seal the liquid injection hole 400 doubly.

Example 4

Figure 7:
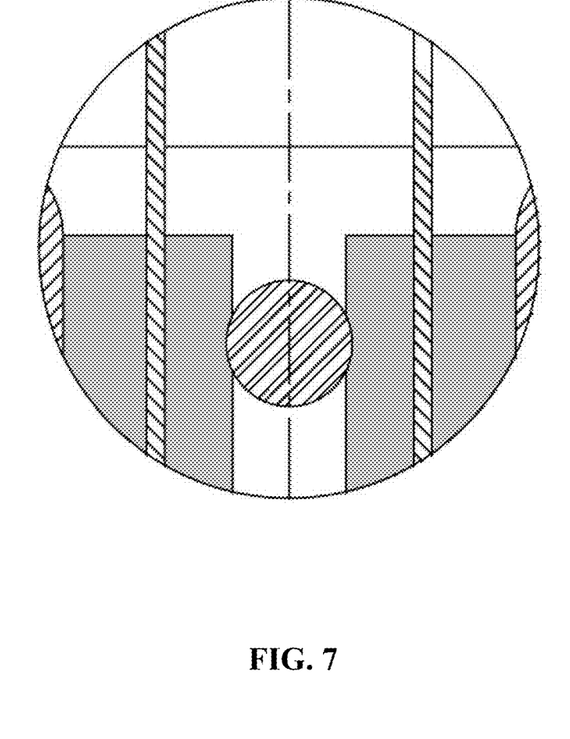
FIG. 7 is a schematic diagram of a sealing member of the disclosure.

As shown in FIG. 7, the example is modified based on Example 1, Example 2, and Example 3. Specifically, the sealing member 400a of the liquid injection hole 400 is one or more steel balls successively inserted into the axial through hole, and the steel balls are in an interference fit with the axial through hole.

Other structures of this example are the same as those in Examples 1-3.

Example 5

Figure 8:
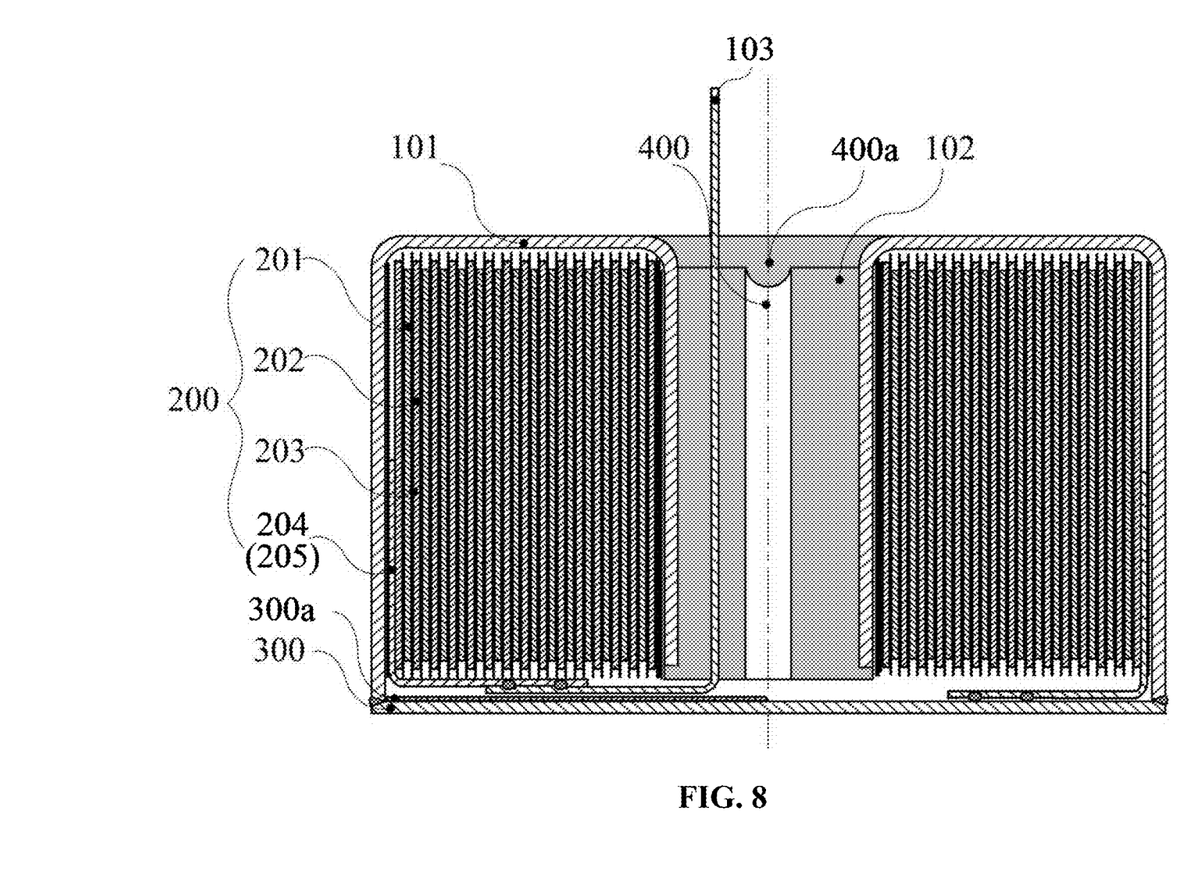
FIG. 8 is a schematic diagram of a cell of Example 5 of the disclosure.

As shown in FIG. 8, the example is modified based on Example 1, Example 2, Example 3 and Example 4. Specifically, only the positive electrode lead 103 (optionally, the negative electrode lead 104) is led out from the insulating part, and the negative electrode 202 is soldered to the cell house 300.

The insulating tape 300a is disposed on the positive electrode lead 103, to prevent a short circuit between the positive electrode lead 103 and the cell house 300, and also to prevent the short circuit between the first intermediate conductor 204 and the cell house 300.

Other structures of this example are the same as those in Examples 1-4.

Example 6

Figure 9:
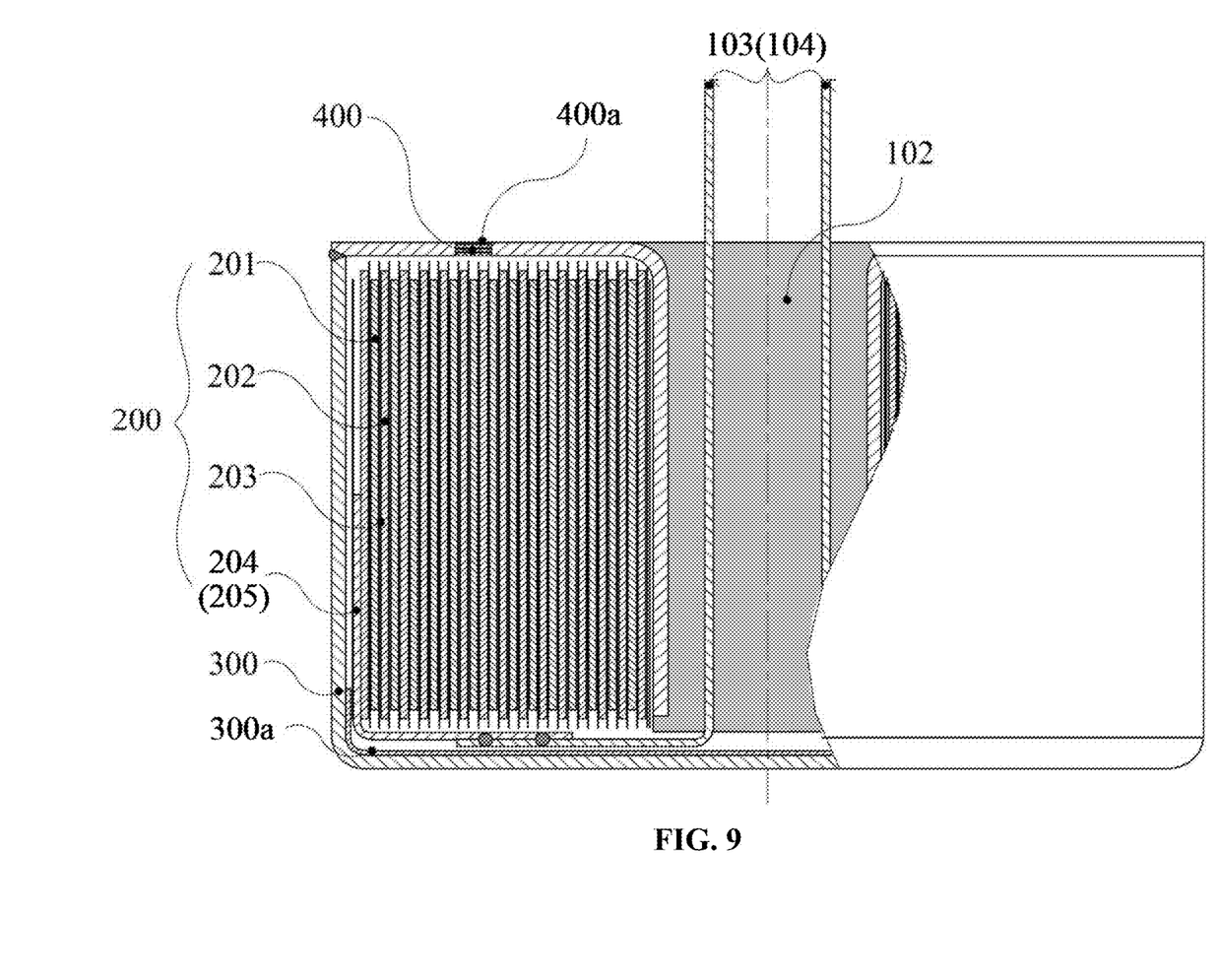
FIG. 9 is a schematic diagram of a cell of Example 6 of the disclosure.

As shown in FIG. 9, the example is modified based on Example 1, Example 2, Example 3, Example 4, and Example 5. Specifically, the liquid injection hole 400 is disposed on the cell house 300. Optionally, the liquid injection hole 400 can also be disposed on other positions of the cell house 300 according to the conventional knowledge mastered by those skilled in the art.

Other structures of this example are the same as those in Examples 1-5.

Example 7

Figure 10:
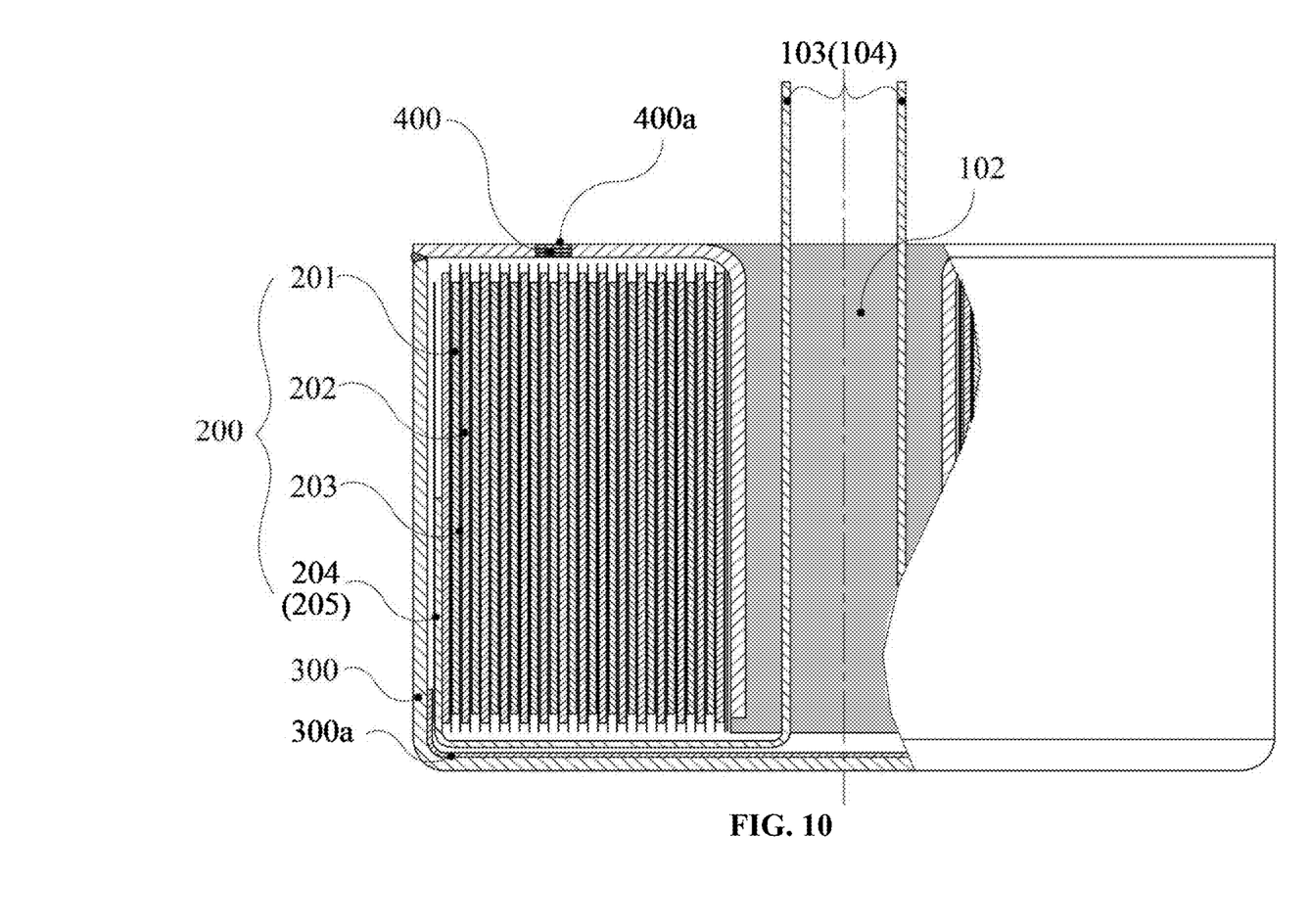
FIG. 10 is a schematic diagram of a cell of Example 7 of the disclosure.

As shown in FIG. 10, the example is modified based on Example 1, Example 2, Example 3, Example 4, Example 5, and Example 6. Specifically, the first intermediate conductor 204 and the second intermediate conductor 205 are omitted, and the lower ends of the positive electrode lead 103 and the negative electrode lead 104 are soldered to the positive electrode 201 or the negative electrode 202, respectively.

Other structures of this example are the same as those in Examples 1-6.

Figure 11:
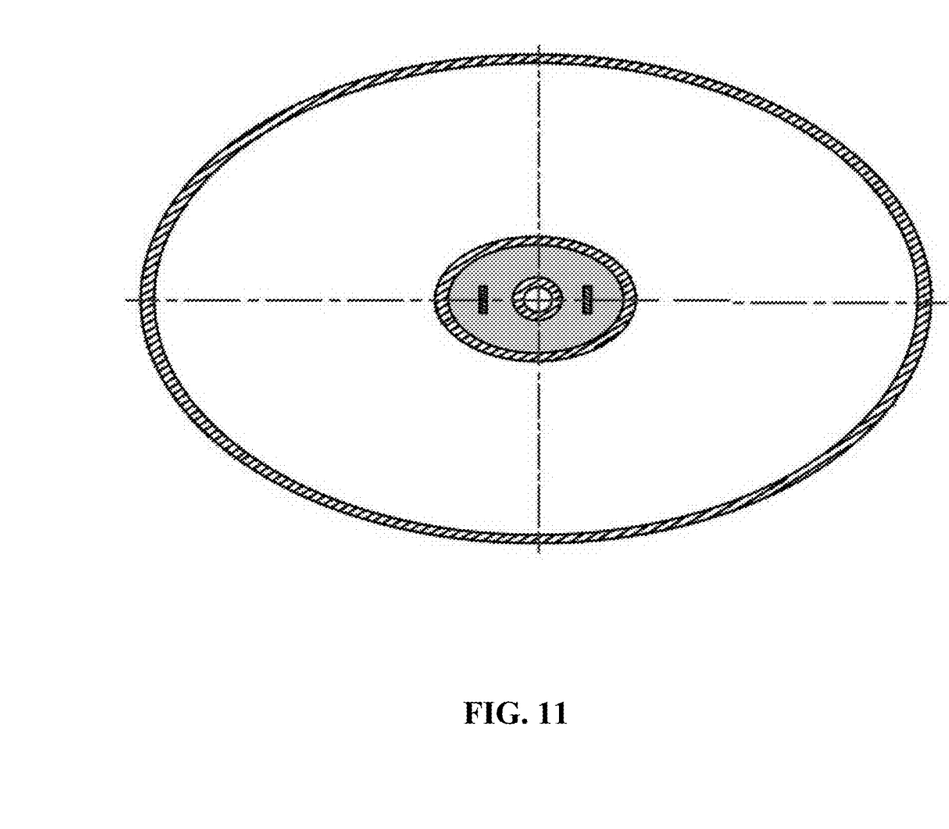
FIG. 11 is a cross sectional view of a cell in accordance with one embodiment of the disclosure.

As shown in FIG. 11, the cell of the disclosure has a cross section in the shape of a circle, an ellipse, and etc.

Preferably, the cell is a cylindrical lithium-ion cell.

The electrode assembly 200 of the disclosure is similar to the traditional cylindrical batteries, that is, at least one positive electrode 201, at least one negative electrode 202, and a diaphragm 203 that separates the positive and negative electrodes, are coaxially spirally wound to form an electrode assembly 200. The positive electrode 201 commonly comprises a foil-shaped (or mesh-shaped) metal current collector and an active material coated on the surface of the metal current collector. Preferably, the foil material comprises aluminum (or aluminum alloy), and the active material is selected from the group consisting of lithium cobaltate, phosphoric acid lithium iron, lithium manganate, lithium titanate, NCM ternary material, NCA ternary material, and a combination thereof. The negative electrode 202 commonly comprises a foil-shaped (or mesh-shaped) metal current collector and an active material coated on the surface of the metal current collector. Preferably, the foil material comprises copper (or copper alloy), and the active material is selected from the group consisting of carbon material, titanic acid lithium, lithium, or a combination thereof. The diaphragm 203 is preferably a plastic film, and more particularly a polyolefin film, such as a polyethylene film. The diaphragm 203 can also be a multilayer structure, such as ceramic, polyethylene, and ceramic. The positive electrode, the negative electrode, and the diaphragm are typically in the form of a flat strip, and spirally wound in an order to form the electrode assembly 200. The components in the electrode assembly are arranged in the following orders: the positive electrode/the diaphragm/the negative electrode/the diaphragm, or the negative electrode/the diaphragm/the positive electrode/the diaphragm. Regardless of a winding method, after the winding is completed and a winding needle is pulled out, a central hole is formed in the center of the electrode assembly. The diameter of the central hole is equal to that of the winding needle and is usually greater than 1 mm.

It should be noted that the dimensions of the cell house 300, the electrode assembly 200, the central hole, and the pin assembly are determined according to the conventional knowledge of the person skilled in the art, and are not described in detail again.

Taking the cell of Example 1 as an example, a method for preparing the cell is detailed as follows:

Polypropylene plastic is injected into the housing 101 by injection molding to form the insulating part 102, which completely wraps around the positive electrode lead 103 and the negative electrode lead 104. And the liquid injection hole is formed on the insulating part 102. The insulating part 102 is tightly connected to the inner wall of a metal housing 101.

The housing 101 is inserted into the central hole. The positive electrode lead 103 and the negative electrode lead 104 of the housing 101 are bent outward and soldered to the first intermediate conductor 204 and the second intermediate conductor 205 of the electrode assembly 200, respectively. The electrode assembly 200 is integrated with the pin assembly and is then disposed in the cell house 300 containing the electrolyte. The pin assembly is soldered to the cell house 300 through a laser soldering process, thus forming a ring-shaped cavity for accommodating the electrode assembly 200.

The electrolyte is injected into the cell through the liquid injection hole of the pin assembly, and then the liquid injection hole is sealed. Following the aforesaid operations, the cell is then performed with general procedures such as formation and sorting to form a cylindrical chargeable and dischargeable secondary lithium-ion cell.

The above is only the preferred examples of the disclosure. It should be noted that for ordinary in the art, improvements and modifications can be made without departing from the principles of the disclosure, and these improvements and improvements should also be regarded as the protection scope of the disclosure.

It will be obvious to those skilled in the art that changes and modifications may be made, and therefore, the aim in the appended claims is to cover all such changes and modifications.

What is claimed is:

1. A cell, comprising:
an electrode assembly, the electrode assembly comprising a central hole, at least one positive electrode, at least one negative electrode, and at least one diaphragm separating the at least one positive electrode from the at least one negative electrode; the at least one positive electrode, the at least one negative electrode and the at least one diaphragm being disposed around the central hole in a spiral winding manner; and the central hole having a diameter of greater than 0 and smaller than that of the cell;
a pin assembly, the pin assembly being disposed in the central hole for polarity separation; the pin assembly comprising a housing comprising an axial through hole; the housing being partially or fully disposed in the central hole; the pin assembly further comprising an insulating part for separating a polarity of the cell and at least one electrode lead; the insulating part being disposed in the axial through hole; the at least one electrode lead passing through the insulating part and being connected to the at least one positive electrode or the at least one negative electrode for separating the polarity of the cell; and
a cell house hermetically connected to the housing, thus forming a ring-shaped seal cavity for accommodating the electrode assembly.

2. The cell of claim 1, wherein the housing comprises a tube and a disc-shaped flange extending outwardly from a top of the tube, and the axial through hole is disposed in the tube.

3. The cell of claim 2, wherein the cell house has a U-shaped longitudinal section.

4. The cell of claim 1, wherein the housing comprises a tube and two circular tubes extending outwardly from two ends of a top of the tube, and the axial through hole is disposed in the tube.

5. The cell of claim 4, wherein the cell house is in the shape of a disc.

6. The cell of claim 1, wherein the housing comprises a circular tube, and the axial through hole is disposed in the circular tube.

7. The cell of claim 6, wherein the cell house has a longitudinal section in the shape of a rectangle having a gap in its upper side.

8. The cell of claim 1, wherein the insulating part is partially or fully disposed in the axial through hole of the housing of the pin assembly.

9. The cell of claim 8, wherein the insulating part comprises a columnar part inserted into the axial through hole and an end cap that extends outwardly from a bottom of the columnar part to fully cover a lower end of the axial through hole.

10. The cell of claim 1, wherein the cell further comprises a liquid injection hole through which an electrolyte flows into the cell.

11. The cell of claim 10, wherein the liquid injection hole is disposed on the pin assembly and/or on the cell house.

12. The cell of claim 11, wherein the liquid injection hole is disposed on the insulating part of the pin assembly.

13. The cell of claim 12, wherein the liquid injection hole is sealed with a sealing member to prevent the electrolyte from leaking out through the liquid injection hole.

14. The cell of claim 13, wherein the sealing member adopts one of the following structures:

the sealing member comprises an end cap structure; the end cap structure comprises an end and an embedded part disposed at the lower end of the end; the end covers the axial through hole, and the embedded part is disposed in the axial through hole; and the sealing member comprises at least one steel ball; the at least one steel ball is disposed in the liquid injection hole in an interference fit.

15. The cell of claim 1, wherein the cell is a lithium-ion cell and further comprises at least one lithium intercalated electrode.

16. The cell of claim 1, wherein the at least one positive electrode, the at least one negative electrode, and the at least one diaphragm each are in the form of a flat strip.

17. The cell of claim 1, wherein components in the electrode assembly are arranged in the following orders: the negative electrode/the diaphragm/the positive electrode/the diaphragm; or the positive electrode/the diaphragm/the negative electrode/the diaphragm.

18. The cell of claim 1, wherein the pin assembly and the cell house comprise a waterproof material.

19. The cell of claim 18, wherein the waterproof material is a metal material or a non-metal material.

20. The cell of claim 19, wherein the metal material is stainless steel, aluminum, or aluminum alloy.

21. The cell of claim 19, wherein the non-metal material is ceramic or plastic.

22. The cell of claim 1, wherein the at least one positive electrode or the at least one negative electrode is electrically connected to the at least one electrode lead with one of the following connection modes:

1) a lower end of the at least one electrode lead is soldered to one end of an intermediate conductor, and the other end of the intermediate conductor is soldered to the at least one positive electrode or the at least one negative electrode; and 2) a lower end of the at least one electrode lead is soldered to the at least one positive electrode or the at least one negative electrode.

23. The cell of claim 1, wherein the insulating part comprises polypropylene.

24. The cell of claim 1, wherein the cell has a circular or elliptical cross section.

* * * * *